US012749981B2

(12) United States Patent
Peng et al.

(10) Patent No.: US 12,749,981 B2
(45) Date of Patent: Sep. 29, 2026

(54) POWER CONVERTER, METHOD OF CONTROLLING THE SAME, AND POWER CONTROL METHOD

(71) Applicant: CHICONY POWER TECHNOLOGY CO., LTD., New Taipei City (TW)

(72) Inventors: Tso-Jen Peng, New Taipei City (TW); Mao-Song Pan, New Taipei City (TW); You-Jie Sung, New Taipei City (TW)

(73) Assignee: CHICONY POWER TECHNOLOGY CO., LTD., New Taipei City (TW)

( * ) Notice: Subject to any disclaimer, the term of this patent is extended or adjusted under 35 U.S.C. 154(b) by 170 days.

(21) Appl. No.: 18/622,072

(22) Filed: Mar. 29, 2024

(65) Prior Publication Data

US 2025/0175085 A1 May 29, 2025

(30) Foreign Application Priority Data

Nov. 27, 2023 (TW) ................................ 112145774

(51) Int. Cl.
*H02M 3/335* (2006.01)
*H02M 1/00* (2007.01)
(Continued)

(52) U.S. Cl.
CPC ..... *H02M 3/33507* (2013.01); *H02M 1/0009* (2021.05); *H02M 1/32* (2013.01);
(Continued)

(58) Field of Classification Search
CPC .. H02M 3/33507; H02M 1/0009; H02M 1/32; H02M 3/01; H02M 3/33571;
(Continued)

(56) References Cited

U.S. PATENT DOCUMENTS

| | | | |
|---|---|---|---|
| 7,660,133 B1 | 2/2010 | Hwang et al. | |
| 10,770,979 B2 | 9/2020 | Sato et al. | |

(Continued)

FOREIGN PATENT DOCUMENTS

| | | | | |
|---|---|---|---|---|
| CN | 114204817 A | | 3/2022 | |
| CN | 114499196 A | * | 5/2022 | ........ H02M 3/33592 |

(Continued)

OTHER PUBLICATIONS

Office Action dated Jun. 3, 2024 of the corresponding Taiwan patent application No. 112145774.

*Primary Examiner* — Jue Zhang
*Assistant Examiner* — Ularislao Cordova
(74) *Attorney, Agent, or Firm* — MUNCY, GEISSLER, OLDS & LOWE, P.C.

(57) ABSTRACT

A power converter includes a transformer, a resonant circuit, a first switch and a second switch, a resonant adjustment circuit, and a controller. The transformer includes a primary-side winding and a secondary-side winding coupled to the primary-side winding. The resonant circuit is coupled to the primary-side winding, and the resonant circuit includes a resonant capacitor and a resonant inductor provided by at least the primary-side winding. The first switch and the second switch are commonly connected to a node, and the node is coupled to the resonant circuit. The resonant adjustment circuit is coupled to the resonant circuit. The controller is used to control an enabled time of the resonant adjustment circuit according to an output voltage of the power converter so as to maintain the efficiency of transmitting the energy from the primary-side winding to the secondary-side winding under a full output voltage range.

11 Claims, 7 Drawing Sheets

(51) Int. Cl.
*H02M 1/32* (2007.01)
*H02M 3/00* (2006.01)

(52) U.S. Cl.
CPC ......... *H02M 3/01* (2021.05); *H02M 3/33571* (2021.05); *H02M 1/0054* (2021.05)

(58) Field of Classification Search
CPC .... H02M 1/0054; H02M 1/0058; H02M 1/08; H02M 1/0043; H02M 3/015; H02M 3/335; H02M 3/33569–33592; Y02B 70/10
See application file for complete search history.

(56) References Cited

U.S. PATENT DOCUMENTS

| | | | | |
|---|---|---|---|---|
| 2008/0025052 | A1 | 1/2008 | Yasumura | |
| 2008/0259647 | A1 | 10/2008 | Risseeuw | |
| 2012/0188797 | A1* | 7/2012 | Nakanishi ......... | H02M 3/33507 363/21.02 |
| 2015/0124487 | A1* | 5/2015 | Fu ..................... | H02M 3/33507 363/17 |
| 2015/0349627 | A1* | 12/2015 | Lin ................... | H02M 3/33571 363/21.02 |
| 2020/0007044 | A1* | 1/2020 | Sato .................. | H02M 3/33571 |
| 2025/0079998 | A1* | 3/2025 | Huang .............. | H02M 3/33571 |

FOREIGN PATENT DOCUMENTS

| | | | | | |
|---|---|---|---|---|---|
| CN | 115036896 | A | | 9/2022 | |
| CN | 115811205 | A | | 3/2023 | |
| CN | 116667658 | A | * | 8/2023 | .............. H02M 3/01 |
| TW | 201014140 | A | | 4/2010 | |
| TW | 201735518 | A | | 10/2017 | |
| TW | 202021251 | A | | 6/2020 | |
| TW | 202201891 | A | | 1/2022 | |
| TW | 202312644 | A | | 3/2023 | |
| TW | 202322536 | A | | 6/2023 | |
| TW | 202337124 | A | | 9/2023 | |

* cited by examiner

POWER CONVERTER, METHOD OF CONTROLLING THE SAME, AND POWER CONTROL METHOD

BACKGROUND

Technical Field

The present disclosure relates to a power converter and a method of controlling the same, and more particularly to a power converter with real-time adjustment of a resonance characteristic under a full output voltage range and a method of controlling the same.

Description of Related Art

The statements in this section merely provide background information related to the present disclosure and do not necessarily constitute prior art.

Under the application of USB PD3.1 fast charging standard, the charging power is increased from the original 100 watts to 240 watts, and supports a maximum voltage output of 48 volts, which means that the power supply needs to provide a voltage change of 5 to 48 volts. For the asymmetric half-bridge (AHB) structure, the advantages of variable voltage are beginning to be highlighted. The asymmetric half-bridge flyback converter (AHB flyback converter) combines the advantages of zero-voltage switching on the primary side of the LLC resonant circuit structure and the wide voltage output of the flyback structure. It is suitable for power conversion applications with high switching frequencies.

However, the inability to achieve high-efficiency operation across the entire output voltage range is a problem and technical bottleneck that deserves attention.

Therefore, in order to solve the aforementioned problems, a parallel capacitor mechanism has been added. However, this manner is only suitable for higher efficiency at a single output voltage, and still cannot achieve operation with better conversion efficiency under the full output voltage range.

Therefore, how to design a power converter and a method of controlling the same to solve the problems and technical bottlenecks in the existing technology has become a critical topic in this field.

SUMMARY

An objective of the present disclosure is to provide a power converter. The power converter includes a transformer, a resonant circuit, a first switch and a second switch, a resonant adjustment circuit, and a controller. The transformer includes a primary-side winding and a secondary-side winding coupled to the primary-side winding. The resonant circuit is coupled to the primary-side winding, and the resonant circuit includes a resonant capacitor and a resonant inductor provided by at least the primary-side winding. The first switch and the second switch are commonly connected to a node, and the node is coupled to the resonant circuit. The resonant adjustment circuit is coupled to the resonant circuit. The controller controls an enabled time of the resonant adjustment circuit according to an output voltage of the power converter so as to maintain the efficiency of transmitting the energy from the primary-side winding to the secondary-side winding under a full output voltage range.

In one embodiment, the resonant circuit includes an adjustment capacitor and an adjustment switch. The adjustment capacitor includes a first terminal and a second terminal, and the first terminal of the adjustment capacitor is coupled to the resonant capacitor, wherein the adjustment capacitor and the resonant capacitor form an equivalent capacitor. The adjustment switch includes a first power terminal, a second power terminal, and a control terminal, wherein the first power terminal of the adjustment switch is coupled to the second terminal of the adjustment capacitor, and the second power terminal of the adjustment switch is coupled to the second switch.

In one embodiment, the power converter includes a current detection unit and a voltage detection unit. The current detection unit is coupled to the resonant capacitor and the adjustment capacitor, and the current detection unit detects a current flowing through the equivalent capacitor to generate a current signal. The voltage detection unit is coupled to the first power terminal of the adjustment switch, and the voltage detection unit detects a switch voltage of the adjustment switch.

In one embodiment, the controller controls the turning on and turning off of the adjustment switch according to a first control signal of controlling the first switch, a second control signal of controlling the second switch, a current signal corresponding to the current flowing through the equivalent capacitor, and the switch voltage of the adjustment switch.

In one embodiment, when the adjustment switch is turned off, a capacitance of the equivalent capacitor is equal to a capacitance of the resonant capacitor; when the adjustment switch is turned on, the capacitance of the equivalent capacitor is equal to an equivalent capacitance of the resonant capacitor and the adjustment capacitor in parallel.

In one embodiment, the controller acquires a charging control signal according to the current signal and the first control signal, and acquires a discharging control signal according to the switch voltage and the second control signal; the controller generates a switch control signal according to the charging control signal and the discharging control signal to control the turning on and turning off of the adjustment switch.

In one embodiment, a current error signal between the current signal and a current reference value is compensated to generate a voltage compensation signal, and an intersection operation of the voltage compensation signal and the first control signal is performed to acquire the charging control signal; the switch voltage is compared with a voltage reference value to generate a voltage comparison signal, and an intersection operation of the voltage comparison signal and the second control signal is performed to acquire the discharging control signal.

In one embodiment, the controller includes a calculation unit, a compensation unit, a first and operation unit, a comparison unit, a second and operation unit, and an or operation unit. The calculation unit receives the current signal and the current reference value, and calculates the current error signal according to the current signal and the current reference value. The compensation unit receives the current error signal, and compensates the current error signal to generate the voltage compensation signal. The first and operation unit receives the voltage compensation signal and the first control signal, and performs an intersection operation of the voltage compensation signal and the first control signal to generate the charging control signal. The comparison unit receives the switch voltage and the voltage reference value, and compares the switch voltage with the voltage reference value to generate the voltage comparison signal. The second and operation unit receives the voltage comparison signal and the second control signal, and performs an intersection operation of the voltage comparison signal and the second control signal to generate the discharging control signal. The or operation unit receives the charging control signal and the discharging control signal, and performs a union operation of the charging control signal and the discharging control signal to generate the switch control signal.

Another objective of the present disclosure is to provide a method of controlling a power converter. The power converter includes a first switch, a second switch, a resonant capacitor, and a resonant adjustment circuit including an adjustment capacitor and an adjustment switch. The method includes steps of: detecting a current flowing through an equivalent capacitor formed by the resonant capacitor and the adjustment capacitor to generate a current signal; detecting a switch voltage of the adjustment switch; acquiring a first control signal of controlling the first switch and a second control signal of controlling the second switch; controlling an enabled time of the resonant adjustment circuit according to the current signal, the switch voltage, the first control signal, and the second control signal when an output voltage of the power converter varies so as to maintain the efficiency of transmitting the energy from a primary-side winding to a secondary-side winding under a full output voltage range.

In one embodiment, the adjustment switch is turned on and turned off according to the according to the current signal, the switch voltage, the first control signal, and the second control signal to control the enabled time of the resonant adjustment circuit.

In one embodiment, when the adjustment switch is turned off, a capacitance of the equivalent capacitor is equal to a capacitance of the resonant capacitor; when the adjustment switch is turned on, the capacitance of the equivalent capacitor is equal to an equivalent capacitance of the resonant capacitor and the adjustment capacitor in parallel.

In one embodiment, the controller acquires a charging control signal according to the current signal and the first control signal, and acquires a discharging control signal according to the switch voltage and the second control signal; the controller generates a switch control signal according to the charging control signal and the discharging control signal to control the turning on and turning off of the adjustment switch.

In one embodiment, a current error signal between the current signal and a current reference value is compensated to generate a voltage compensation signal, and an intersection operation of the voltage compensation signal and the first control signal is performed to acquire the charging control signal; the switch voltage is compared with a voltage reference value to generate a voltage comparison signal, and an intersection operation of the voltage comparison signal and the second control signal is performed to acquire the discharging control signal.

In one embodiment, the method further includes steps of: providing a calculation unit to receive the current signal and the current reference value, and calculate the current error signal according to the current signal and the current reference value; providing a compensation unit to receive the current error signal, and compensate the current error signal to generate the voltage compensation signal; providing a first and operation unit to receive the voltage compensation signal and the first control signal, and perform an intersection operation of the voltage compensation signal and the first control signal to generate the charging control signal; providing a comparison unit to receive the switch voltage and the voltage reference value, and compare the switch voltage with the voltage reference value to generate the voltage comparison signal; providing a second and operation unit to receive the voltage comparison signal and the second control signal, and perform an intersection operation of the voltage comparison signal and the second control signal to generate the discharging control signal; providing an or operation unit to receive the charging control signal and the discharging control signal, and perform an union operation of the charging control signal and the discharging control signal to generate the switch control signal.

Further another objective of the present disclosure is to provide a power control method. The method includes steps of: detecting a current flowing through an equivalent capacitor to generate a current signal; detecting a voltage of an adjustment switch; acquiring a control signal of controlling a switch, and controlling an enabled time according to the current signal, the voltage, and the control signal when an output voltage varies so as to maintain the efficiency of transmitting the energy under a full output voltage range.

Accordingly, the power converter, the method of controlling the same, and the power control method proposed by the present disclosure have the following characteristics and advantages: 1. the present disclosure can dynamically adjust the time length of the resonance operation and the activation timing of the resonance compensation at any voltage in the full output voltage range, and therefore it can not only achieve the immediacy of on-line resonance compensation, but also accurately achieve the completeness of resonance compensation; 2. by controlling the integration of the adjustment capacitor into the resonant capacitor, the discharge time of the equivalent capacitor can be extended under the resonant current with a lower current peak value, and therefore not only the component losses on the secondary side can be reduced to increase efficiency, but also components with smaller current-withstanding capability can be selected to reduce circuit costs; 3. it is to ensure conduction switching of the adjustment switch in a zero voltage state, i.e., ZVS (zero-voltage switching) so as to reduce switching losses; 4. after the capacitance compensation is completed, a zero-voltage switching control opportunity can be provided for the high-side switch (i.e., the first switch) and the low-side switch (i.e., the second switch).

It is to be understood that both the foregoing general description and the following detailed description are exemplary, and are intended to provide further explanation of the present disclosure as claimed. Other advantages and features of the present disclosure will be apparent from the following description, drawings, and claims.

BRIEF DESCRIPTION OF DRAWINGS

The present disclosure can be more fully understood by reading the following detailed description of the embodiment, with reference made to the accompanying drawing as follows.

DETAILED DESCRIPTION

Figure 1:
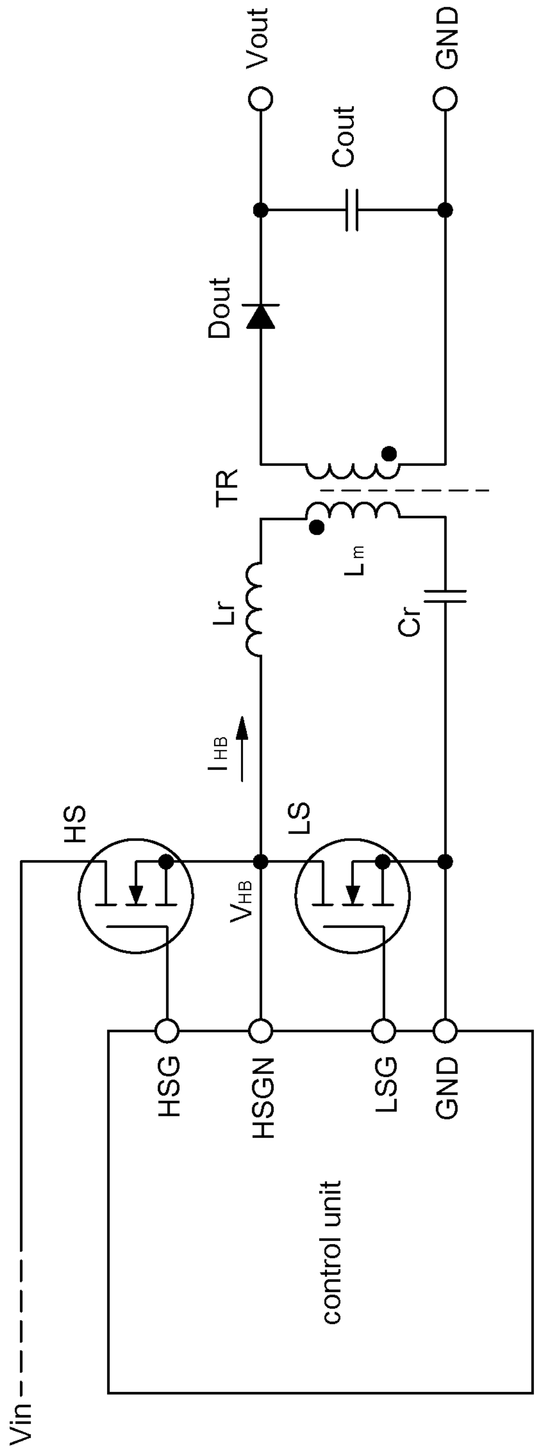
FIG.1 PRIOR ART
FIG. 1 is a block circuit diagram of an asymmetrical half bridge (AHB) flyback converter.

Reference will now be made to the drawing figures to describe the present disclosure in detail. It will be understood that the drawing figures and exemplified embodiments of present disclosure are not limited to the details thereof.

Figure 2:
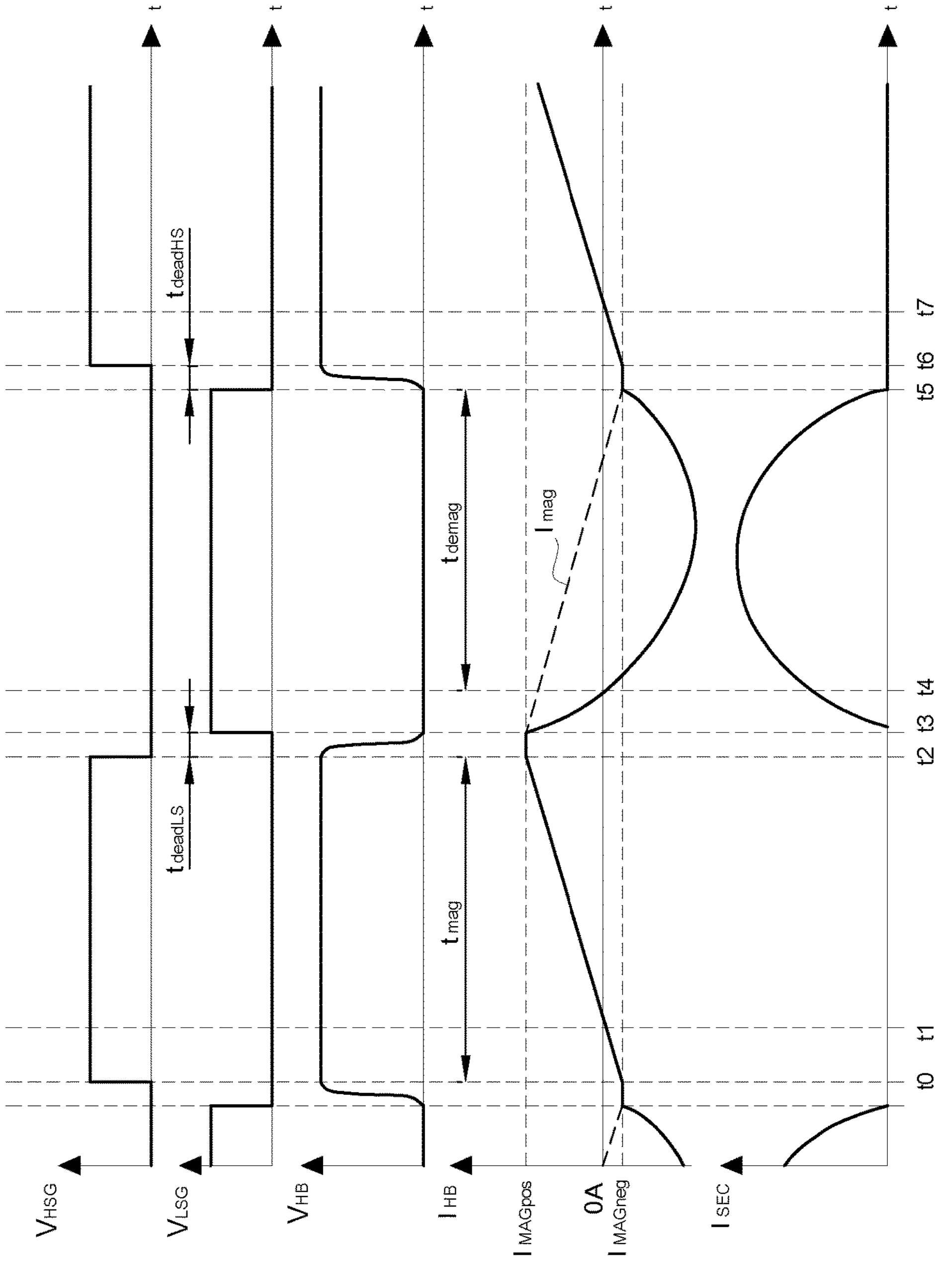
FIG.2 PRIOR ART
FIG. 2 is waveform diagrams of related voltages, currents, and control signals of the AHB flyback converter in operation.

Please refer to FIG. 1 and FIG. 2, which respectively show a block circuit diagram of an asymmetrical half bridge (AHB) flyback converter and waveform diagrams of related voltages, currents, and control signals of the AHB flyback converter in operation. When the high-side switch HS is turned on, the input voltage Vin charges a main inductor (i.e., the magnetizing inductor) of the transformer TR and a resonant capacitor Cr. Therefore, a current Imag flowing through the main inductor gradually increases, and the current excitation is like the current waveform of a flyback converter. When the low-side switch LS is turned on, the energy is transferred from the resonant capacitor Cr on the primary side of the transformer TR to the secondary side of the transformer TR, and the waveform of the resonant current Icr is like the current waveform of a half-sine wave of a resonant converter.

Due to the characteristics of the output wide voltage, it will affect the turned-on time of the low-side switch LS. Under this operation, the magnetizing inductor will be clamped at n Vo (that is, n times the output voltage) to demagnetize. Since n is a fixed parameter (where n is the turns ratio of the secondary-side winding to the primary-side winding of the transformer TR), the formula may be as follows:

$$L^*(di/dt)=V, \text{ and it can be rewritten as } dt=L^*di/nVo.$$

Figure 3:
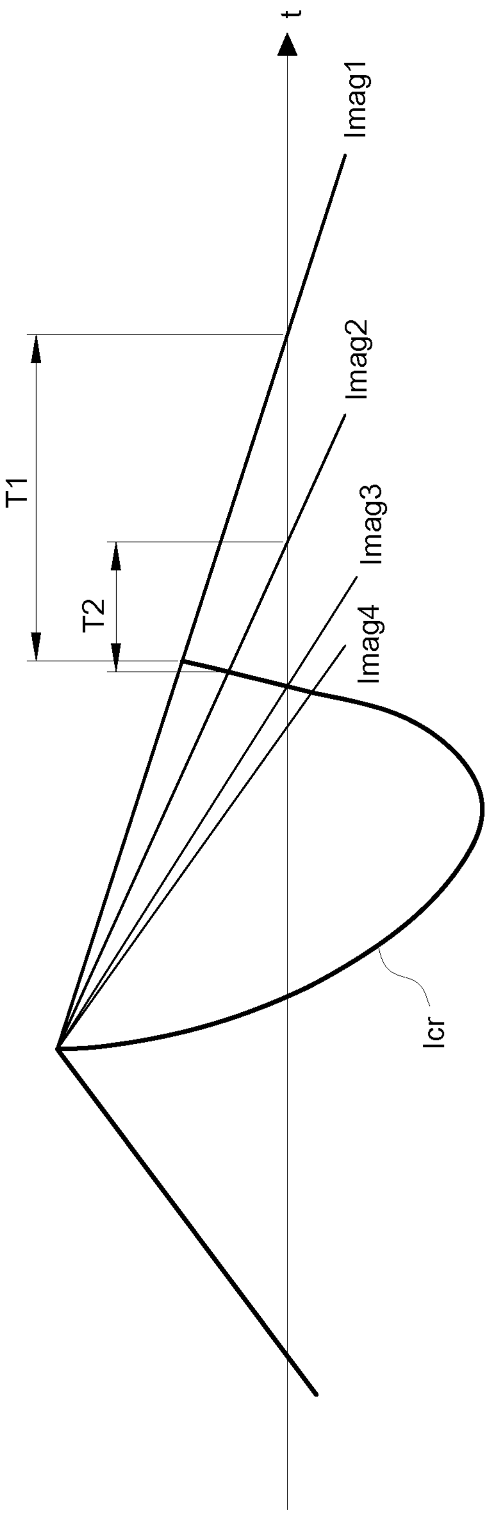
FIG.3 PRIOR ART
FIG. 3 is waveform diagrams of inductor currents and a resonant current of the AHB flyback converter in operation.

According to the above formula, when the output voltage Vo changes, the dt time (that is, the demagnetization time) will change. Please refer to FIG. 3, which shows waveform diagrams of inductor currents and a resonant current of the AHB flyback converter in operation. For example, Imag1 is the current waveform of the main inductor when the output voltage Vo is 20 volts, that is, the waveform when the output voltage Vo is smaller; Imag4 is the current waveform of the main inductor when the output voltage Vo is 48 volts, that is, the waveform when the output voltage Vo is larger. Therefore, when the output voltage Vo is smaller, the demagnetization time will be greatly increased.

For the resonant current Icr, if the resonant capacitor Cr has a fixed capacitance, the longer the demagnetization time is, the energy stored in the resonant capacitor Cr will be discharged early. Therefore, it will cause the primary-side current to flow through the charged resonant capacitor and then pass to the secondary side, thereby significantly reducing the energy transmission efficiency and leading to a decrease in efficiency. For the Imag1 and Icr shown in FIG. 3, when the resonant capacitor Cr is fully discharged, the current of the main inductor (i.e., the primary-side current) still needs to pass through the T1 period before the energy can be completely transferred to the secondary side. Therefore, the operation during the T1 period after the resonance state ends will cause losses, resulting in a decrease in efficiency. The same situation also exists the current relationship between Imag2 and Icr, and the operation during the T2 period after the resonance state ends will also cause losses. However, the current relationship between Imag4 and Icr will cause the low-side switch LS to turn off early, resulting in switching loss, which will also lead to a decrease in efficiency. Therefore, when the current of the main inductor and the resonant current reach the current relationship between Imag3 and Icr, it is the optimal and most efficient operation.

Figure 4:
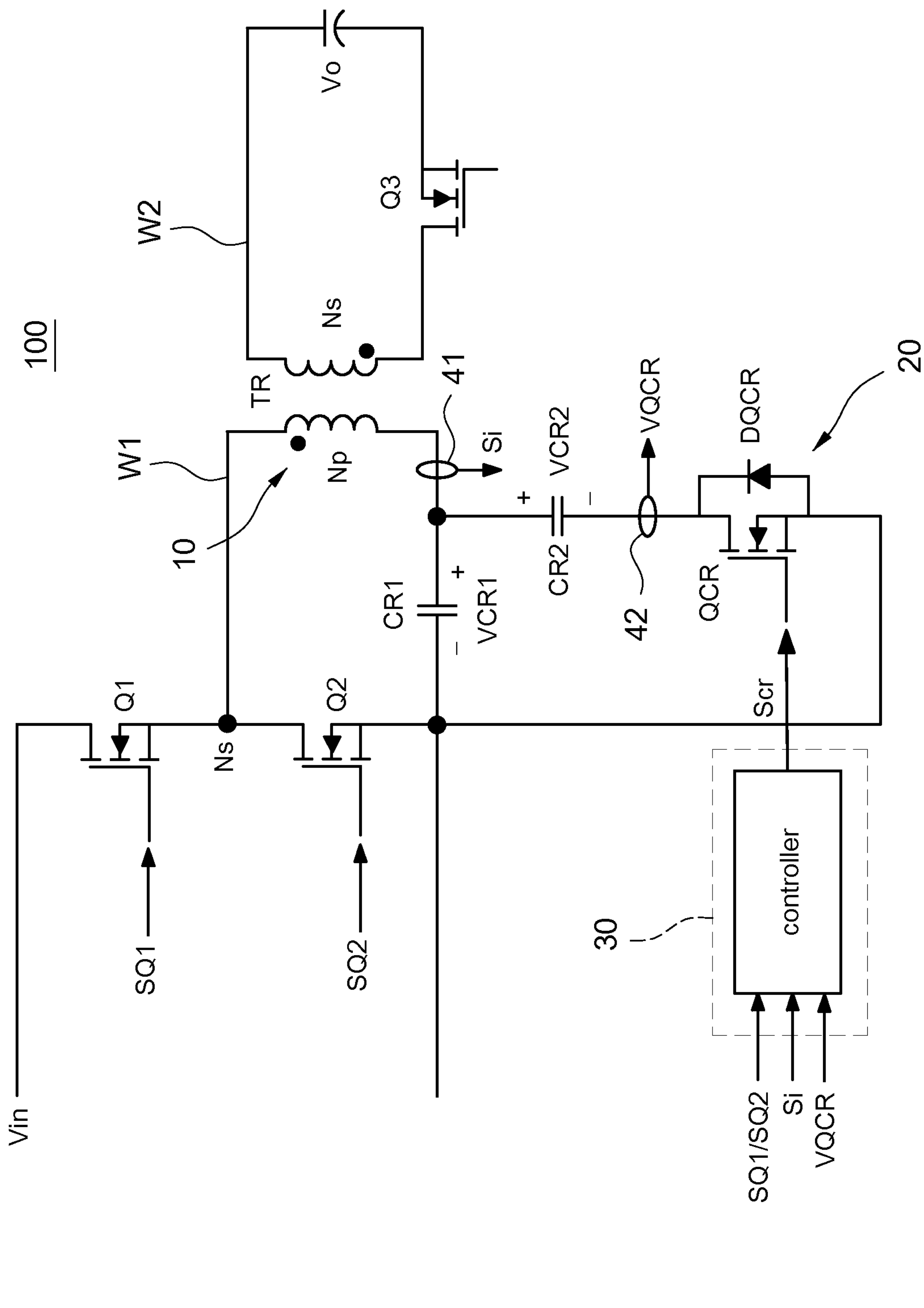
FIG. 4 is a block circuit diagram of a power converter according to the present disclosure.

Please refer to FIG. 4, which shows a block circuit diagram of a power converter according to the present disclosure. As shown in FIG. 4, the power converter 100 includes a transformer TR, a resonant circuit 10, a first switch Q1 and a second switch Q2, a resonant adjustment circuit 20, and a controller 30.

The transformer TR includes a primary-side winding W1 and a secondary-side winding W2 coupled to the primary-side winding W1 for providing an electrical isolation between primary-side circuits and secondary-side circuits. A voltage ratio between a voltage at the secondary-side winding W2 and a voltage at the primary-side winding W1 is equal to a turns ratio between a secondary-side winding turns Ns of the secondary-side winding W2 and a primary-side winding turns Np of the primary-side winding W1, i.e., Ns/Np.

The resonant circuit 10 is coupled to the primary-side winding W. The resonant circuit 10 includes a resonant capacitor CR1 and a resonant inductor, wherein the resonant inductor is provided by at least the primary-side winding W1. In other words, the resonant inductor may be an equivalent inductance formed by a leakage inductor and/or a magnetizing inductor at the primary side of the transformer TR.

In one embodiment, the first switch Q1 and the second switch Q2 are referred to as a high-side switch and a low-side switch respectively. The first switch and the second switch are commonly connected to a node Ns, and the node Ns is coupled to the resonant circuit 10. In particular, the first switch Q1 and the second switch Q2 are complementary in turning on and turning off, that is, when the first switch Q1 is turned on, the second switch Q2 is turned off, and on the contrary, when the first switch Q1 is turned off, the second switch Q2 is turned on. In particular, when the first switch Q1 is turned on, it is used for charging operation (that is, the resonant capacitor CR1 is in an energy storage operation), and when the second switch Q2 is turned on, it is used for discharging operation (that is, the resonant capacitor CR1 is in an energy release operation).

The resonant adjustment circuit 20 is coupled to the resonant circuit 10. As shown in FIG. 4, the resonant adjustment circuit 20 includes an adjustment capacitor CR2 and an adjustment switch QCR. The adjustment capacitor CR2 includes a first terminal and a second terminal. The first terminal of the adjustment capacitor CR2 is coupled to the resonant capacitor CR1. According to the connection relationship between the adjustment capacitor CR2 and the resonant capacitor CR1, the adjustment capacitor CR2 and the resonant capacitor CR1 can form an equivalent capacitor CR. In general, the capacitance of the adjustment capacitor CR2 is greater than or equal to the capacitance of the resonant capacitor CR1. In one embodiment, the capacitance of the adjustment capacitor CR2 is three times the capacitance of the resonant capacitor CR1. Specifically, when the adjustment switch QCR is turned off, the adjustment capacitor CR2 is not coupled to the resonant capacitor CR1, and therefore the capacitance of the equivalent capacitor CR is equal to the capacitance of the resonant capacitor CR1. When the adjustment switch QCR is turned on, the adjustment capacitor CR2 is coupled to the resonant capacitor CR1, and therefore the capacitance of the equivalent capacitor CR is equal to an equivalent capacitance of the resonant capacitor CR1 and the adjustment capacitor CR2 in parallel. Therefore, the capacitance of the equivalent capacitor CR can be determined by designing the capacitance of the resonant capacitor CR1 and/or the capacitance of the adjustment capacitor CR2, and by controlling the turning on and turning off of the adjustment switch QCR.

The adjustment switch QCR includes a first power terminal, a second power terminal, and a control terminal. The first power terminal of the adjustment switch QCR is coupled to the second terminal of the adjustment capacitor CR2, and the second power terminal of the adjustment switch QCR is coupled to the second switch Q2.

The controller 30 controls an enabled time of the resonant adjustment circuit 20 to maintain the efficiency of transmitting the energy from the primary-side winding W1 to the secondary-side winding W2 under a full output voltage range so that the power converter 100 operates with high efficiency. For example, but this does not limit the present disclosure, if the output voltage Vo of the power converter 100 ranges from 5 volts to 48 volts, the controller 30 can control the enabled time of the resonant adjustment circuit 20 so that the output voltage Vo of the power converter 100 can be adjusted in high efficiently under the output voltage Vo between 5 volts and 48 volts. In one embodiment, the controller 30 may be implemented by a single integrated circuit (IC) as a control IC.

As shown in FIG. 4, the power converter 100 further includes a current detection unit 41 and a voltage detection unit 42. The current detection unit 41 is coupled to the resonant capacitor CR1 and the adjustment capacitor CR2, and the current detection unit 41 is used to detect a current flowing through the equivalent capacitor CR formed by the adjustment capacitor CR2 and the resonant capacitor CR1 to generate a current signal Si. In particular, the current signal Si is proportional to the current flowing through the equivalent capacitor CR. That is, when the current flowing through the equivalent capacitor CR is larger, the value of the current signal Si is larger, on the contrary, when the current flowing through the equivalent capacitor CR is smaller, the value of the current signal Si is smaller. Therefore, the current flowing through the equivalent capacitor CR can be determined based on the value of the current signal Si.

The voltage detection unit 42 is coupled to the first power terminal of the adjustment switch QCR, and the voltage detection unit 42 is used to detect a switch voltage VQCR of the adjustment switch QCR. If the adjustment switch QCR is an n-type MOSFET as an example, the first power terminal is a drain, the second power terminal is a source, and the control terminal is a gate. Therefore, the switch voltage VQCR detected by the voltage detection unit 42 is a voltage at the drain. In one embodiment, the controller 30, the resonant adjustment circuit 20, the current detection unit 41, and the voltage detection unit 42 may be integrated into a single integrated circuit (IC) as a control IC.

Specifically, the first switch Q1 can be turned on and turned off by the first control signal SQ1, and the second switch Q2 can be turned on and turned off by the second control signal SQ2. In particular, the first control signal SQ1 and the second control signal SQ2 may be provided by a control unit or a control circuit not shown in FIG. 4. The controller 30 receives the first control signal SQ1, the second control signal SQ2, the current signal Si provided by the current detection unit 41, and the switch voltage VQCR provided by the voltage detection unit 42.

Therefore, the controller 30 controls the turning on and turning off of the adjustment switch QCR according to the first control signal SQ1 of controlling the first switch Q2, the second control signal SQ2 of controlling the second switch Q2, the current signal Si corresponding to the current flowing through the equivalent capacitor CR, and the switch voltage VQCR of the adjustment switch QCR to control the enabled time of the resonant adjustment circuit 20 so that the output voltage Vo of the power converter 100 can be adjusted in high efficiently under the full output voltage range.

Figure 5:
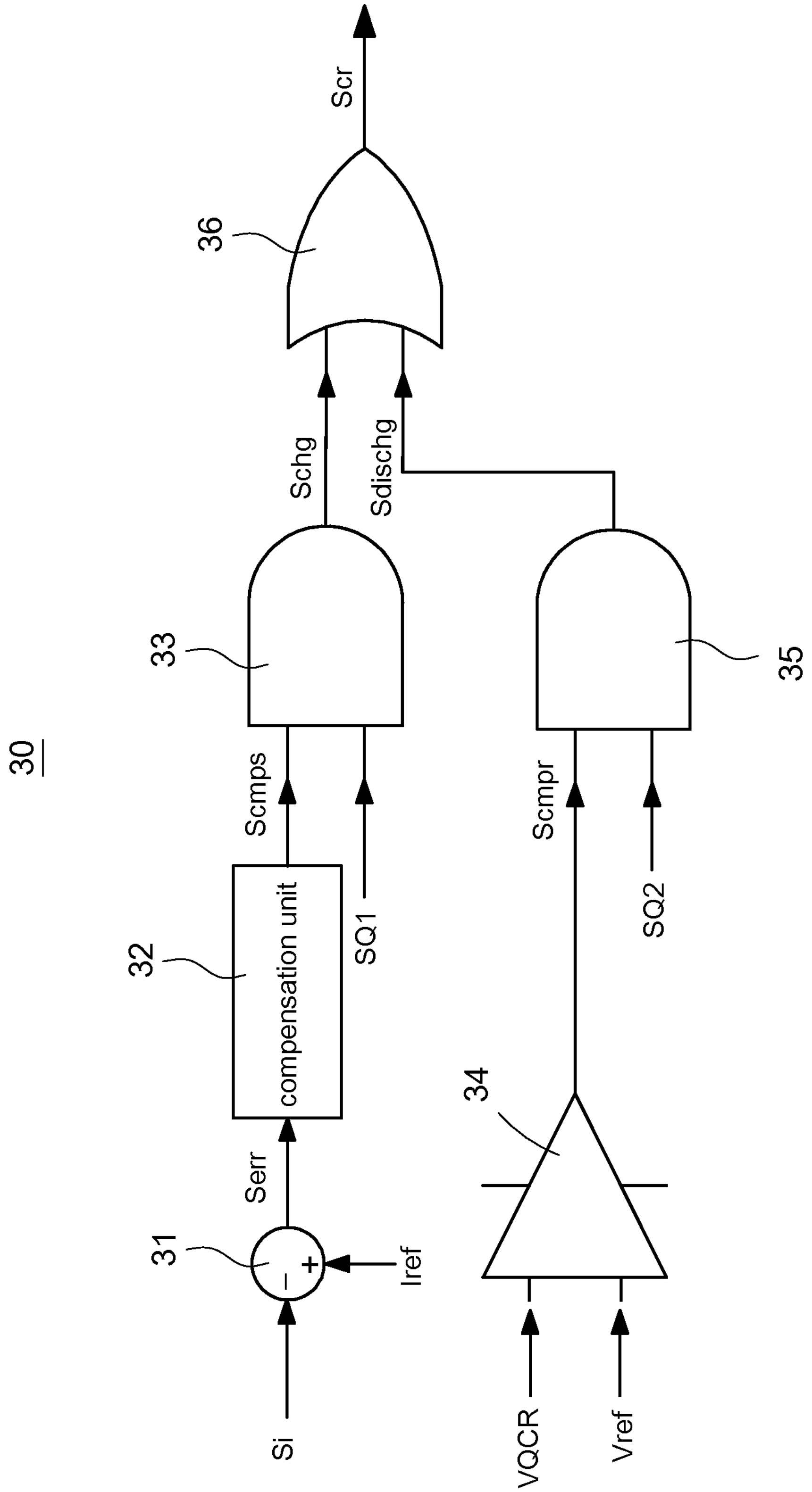
FIG. 5 is a block circuit diagram of a controller of the power converter according to the present disclosure.

Please refer to FIG. 5, which shows a block circuit diagram of a controller of the power converter according to the present disclosure, and also refer to FIG. 4. The design of the controller 30 shown in FIG. 4 can be seen in FIG. 5. As shown in FIG. 5, the controller 30 includes a calculation unit 31, a compensation unit 32, a first and operation unit 33, a comparison unit 34, a second and operation unit 35, and an or operation unit 36.

The controller 30 acquires a charging control signal Schg according to the current signal Si and the first control signal SQ1, and acquires a discharging control signal Sdischg according to the switch voltage VQCR and the second control signal SQ2. The controller 30 generates a switch control signal Scr according to the charging control signal Schg and the discharging control signal Sdischg to control the turning on and turning off of the adjustment switch QCR.

Specifically, a current error signal Serr between the current signal Si and a current reference value Iref is compensated to generate a voltage compensation signal Scmps, and an intersection operation (AND operation) of the voltage compensation signal Scmps and the first control signal SQ1 is performed to acquire the charging control signal Schg. The switch voltage VQCR is compared with a voltage reference value Vref to generate a voltage comparison signal Scmpr, and an intersection operation of the voltage comparison signal Scmpr and the second control signal SQ2 is performed to acquire the discharging control signal Sdischg.

Specifically, the calculation unit 31 receives the current signal Si and the current reference value Iref, and calculates the current error signal Serr according to the current signal Si and the current reference value Iref. In one embodiment, the current reference value Iref may be set zero amp. The compensation unit 32 receives the current error signal Serr, and compensates the current error signal Serr to generate the voltage compensation signal Scmps. The first and operation unit 33 receives the voltage compensation signal Scmps and the first control signal SQ1, and performs an intersection operation of the voltage compensation signal Scmps and the first control signal SQ1 to generate the charging control signal Schg. Therefore, the operation of the calculation unit 31, the compensation unit 32, and the first and operation unit 33 is to determine the time length of the resonance operation so as to match the demagnetization time of the main inductor, thereby maintaining the power converter 100 in high-efficiency operation.

The comparison unit 34 receives the switch voltage VQCR and the voltage reference value Vref, and compares the switch voltage VQCR with the voltage reference value Vref to generate the voltage comparison signal Scmpr. The second and operation unit 35 receives the voltage comparison signal Scmpr and the second control signal SQ2, and performs an intersection operation of the voltage comparison signal Scmpr and the second control signal SQ2 to generate the discharging control signal Sdischg. Therefore, the operation of the comparison unit 34 and the second and operation unit 35 is to determine the activation timing of the resonance compensation. In one embodiment, the resonance compensation is activated when the first switch Q1 is turned on, which means that resonance compensation is started when the equivalent capacitor CR is charged.

Finally, the or operation unit 36 receives the charging control signal Schg and the discharging control signal Sdischg, and performs a union operation (OR operation) of the charging control signal Schg and the discharging control signal Sdischg to generate the switch control signal Scr to control the turning on and turning off of the adjustment switch QCR.

Figure 6:
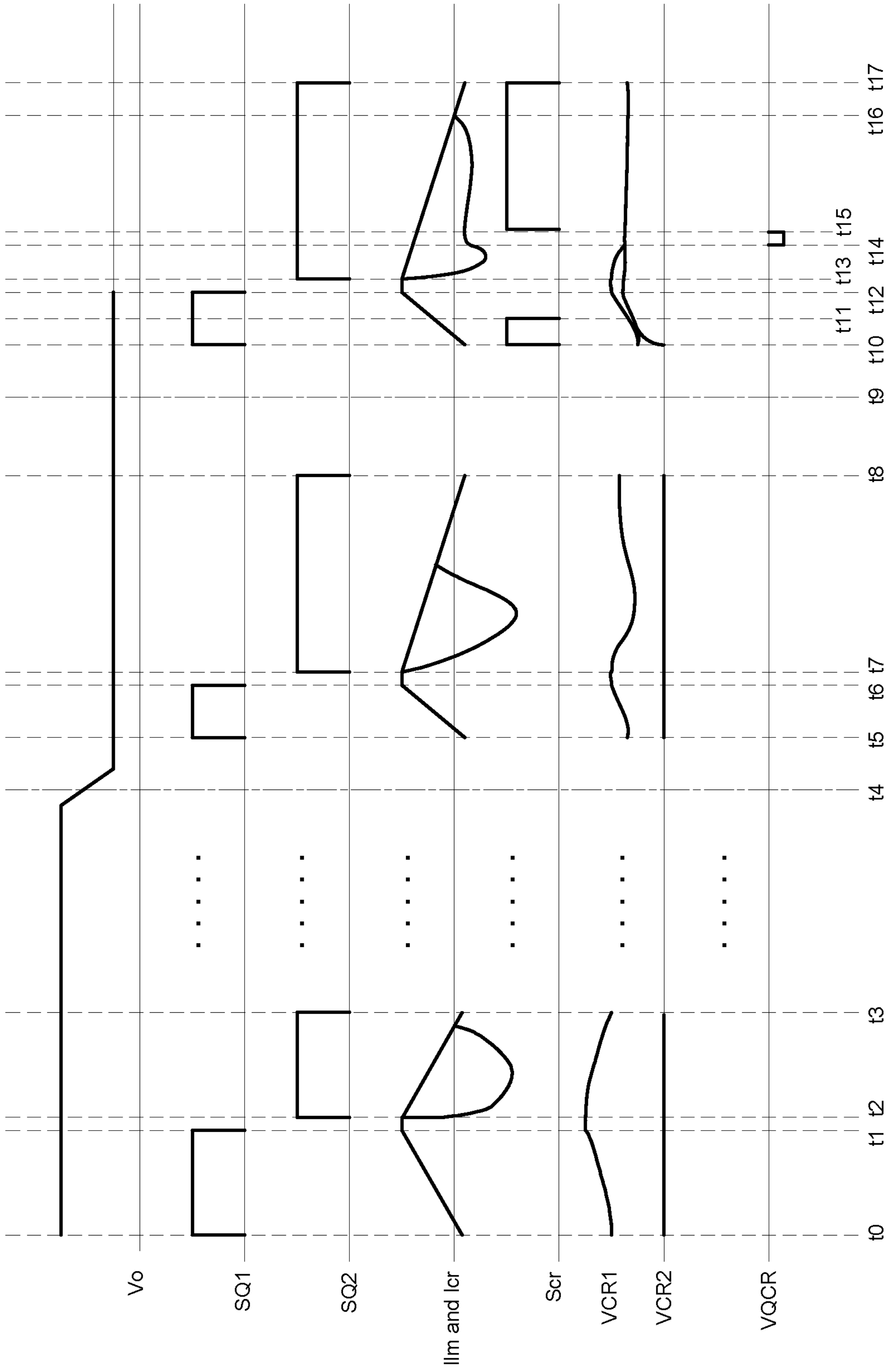
FIG. 6 is waveform diagrams of related voltages, currents, and control signals of the power converter in operation.

Please refer to FIG. 6, which waveform diagrams of related voltages, currents, and control signals of the power converter in operation, and also refer to FIG. 4 and FIG. 5. During the period from time t0 to before time t4, the first switch Q1 and the second switch Q2 are complementarily turned on and turned off. Therefore, after the time t0, when the first switch Q1 is turned on, the main inductor of the transformer TR (i.e., the magnetizing inductor) and resonant capacitor CR1 are charged and stored energy. At time t2, the second switch Q2 is turned on, the resonant circuit 10 starts to perform the resonance operation. As shown in FIG. 6, under the output voltage Vo during the period from time t0 to before time t4, the power converter 100 operates with high efficiency.

During the period from time t4 to before time t9, the output voltage Vo decreases at time t4. If no resonance compensation of the adjustment capacitor CR2 is activated, it is clearly seen that the resonant capacitor CR1 is fully discharged early but the demagnetization time of the main inductor still continues during the period from time t7 to time t8, and therefore the energy transmission efficiency is significantly reduced, thereby leading to a decrease in efficiency.

During the period from time t9 to before time t17, the resonance compensation of the adjustment capacitor CR2 is activated. Although the output voltage Vo decreases at time t9, unlike no resonance compensation of the adjustment capacitor CR2 (during the period from time t4 to before time t9). Therefore, through the operation and control of the circuits disclosed in FIG. 4 and FIG. 5, when the output voltage Vo decreases, the equivalent capacitor CR increases due to the integration of the adjustment capacitor CR2 into the resonant capacitor CR1. Accordingly, the discharge time of the equivalent capacitor CR can be extended so as to match the demagnetization time of the main inductor, thereby maintaining the power converter 100 in high-efficiency operation.

Specifically, as shown in FIG. 6, at time t10, the first control signal SQ1 turns on the first switch Q1. At the same time, the switch control signal Scr generated by the controller 30 also turns on the adjustment switch QCR of the resonant adjustment circuit 20. Therefore, a voltage VCR2 across two terminals of the adjustment capacitor CR2 continues to increase due to the charging of the adjustment capacitor CR2. Until time t14, since the resonant capacitor CR1 releases energy, a voltage CR1 across two terminals of the resonant capacitor CR1 is less than the voltage VCR2. In this condition, the switch voltage VQCR on the adjustment switch QCR becomes negative, and therefore a body diode DQCR of the adjustment switch QCR is forward biased to be turned on. Corresponding to the comparison between the switch voltage VQCR and the voltage reference value Vref disclosed in FIG. 5, it is assumed that the voltage reference value Vref is 0 volt (considering the body diode DQCR as ideal) or −0.7 volts (considering the voltage difference between the two terminals when the body diode DQCR is turned on), and therefore the voltage comparison signal Scmpr generated after comparison is at a high level. Also, since the second control signal SQ2 with the high level turns on the second switch Q2, the discharging control signal Sdischg after the intersection operation of the second and operation unit 35 is at a high level. Therefore, the or operation unit 36 performs the union operation of the charging control signal Schg and the discharging control signal Sdischg to generate the switch control signal Scr with the high level to turn on the adjustment switch QCR so as to control the integration of the adjustment capacitor CR2 into the resonant capacitor CR1 to increases the equivalent capacitor CR, thus extending the discharge time of the equivalent capacitor CR. Incidentally, turning on the adjustment switch QCR at this time can ensure conduction switching of the adjustment switch QCR in a zero voltage state, i.e., ZVS (zero-voltage switching). Until time t16, the demagnetization time of the main inductor can be matched to maintain the power converter 100 in high-efficiency operation. Incidentally, the period between time t16 and time t17 may be used as a time for zero-voltage switching control of the first switch Q1 and the second switch Q2.

Accordingly, by controlling the integration of the adjustment capacitor CR2 into the resonant capacitor CR1, the discharge time of the equivalent capacitor CR can be extended under the resonant current Icr with a lower current peak value. Therefore, not only the component losses on the secondary side can be reduced (such as secondary side coil loss, secondary side rectification loss, and secondary side circuit board loss, expressed in the following formula (1)) to increase efficiency, but also components with smaller current-withstanding capability can be selected to reduce circuit costs. In particular, the selected component specifications can be improved to the following formula (2):

$$\left(\frac{2}{(1-\cos(D\pi))}\right)^2 \times D, \qquad \text{(formula (1))}$$

$$\left(\frac{2}{(1-\cos(D\pi))}\right). \qquad \text{(formular (2))}$$

Figure 7:
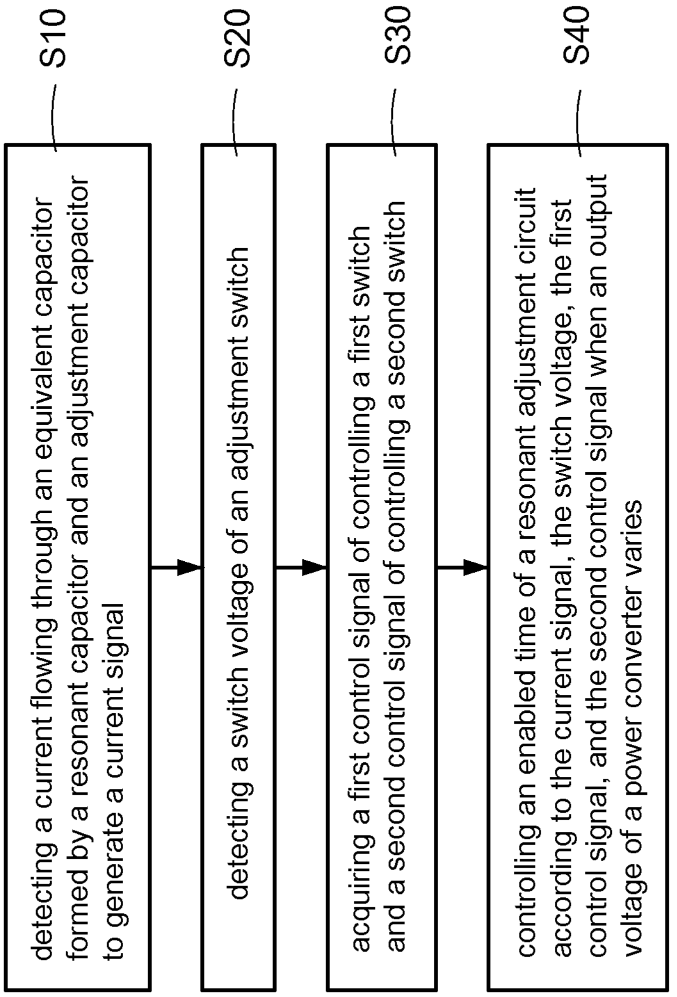
FIG. 7 is a flowchart of a method of controlling the power converter according to the present disclosure.

Please refer to FIG. 7, which shows a flowchart of a method of controlling the power converter according to the present disclosure. The description of circuit structures of the power converter can refer to the previously disclosed FIG. 4 to FIG. 6, as well as its corresponding explanations, and will not be repeated here. The method includes steps of: first, detecting the current flowing through the equivalent capacitor CR formed by the resonant capacitor CR1 and the adjustment capacitor CR2 to generate the current signal (step S10). When the adjustment switch QCR is turned off, the capacitance of the equivalent capacitor CR is equal to the capacitance of the resonant capacitor CR1. When the adjustment switch QCR is turned on, the capacitance of the equivalent capacitor CR is equal to an equivalent capacitance of the resonant capacitor CR1 and the adjustment capacitor CR2 in parallel.

Afterward, detecting the switch voltage VQCR of the adjustment switch QCR by the voltage detection unit 42 (step S20). Afterward, acquiring the first control signal SQ1 of controlling the first switch Q1 and the second control signal SQ2 of controlling the second switch Q2 (step S30).

Finally, controlling an enabled time of the resonant adjustment circuit 20 according to the current signal Si, the switch voltage VQCR, the first control signal SQ1 (i.e., controlling the enabled time of the resonant adjustment circuit 20 by turning on and turning off the adjustment switch QCR), and the second control signal SQ2 when an output voltage Vo of the power converter 100 varies so as to maintain the efficiency of transmitting the energy from the primary-side winding W1 to the secondary-side winding W2 under a full output voltage range (step S40). Since the operation method of the power converter corresponds to the circuit control operation of the power converter, please refer to the previous detailed description, so no further details will be given here.

In summary, the present disclosure has the following features and advantages:

1. The present disclosure can dynamically adjust the time length of the resonance operation and the activation timing of the resonance compensation at any voltage in the full output voltage range, and therefore it can not only achieve the immediacy of on-line resonance compensation, but also accurately achieve the completeness of resonance compensation.
2. By controlling the integration of the adjustment capacitor into the resonant capacitor, the discharge time of the equivalent capacitor can be extended under the resonant current with a lower current peak value, and therefore not only the component losses on the secondary side can be reduced to increase efficiency, but also components with smaller current-withstanding capability can be selected to reduce circuit costs.
3. It is to ensure conduction switching of the adjustment switch in a zero voltage state, i.e., ZVS (zero-voltage switching) so as to reduce switching losses.
4. After the capacitance compensation is completed, a zero-voltage switching control opportunity can be provided for the high-side switch (i.e., the first switch) and the low-side switch (i.e., the second switch).

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A power converter comprising:

a transformer comprising a primary-side winding and a secondary-side winding coupled to the primary-side winding, a resonant circuit coupled to the primary-side winding, and the resonant circuit comprising a resonant capacitor and a resonant inductor provided by at least the primary-side winding, a first switch and a second switch commonly connected to a node, and the node coupled to the resonant circuit, a resonant adjustment circuit coupled to the resonant circuit, and the resonant adjustment circuit comprising:

an adjustment capacitor comprising a first terminal and a second terminal, and the first terminal of the adjustment capacitor coupled to the resonant capacitor, wherein the adjustment capacitor and the resonant capacitor form an equivalent capacitor, and an adjustment switch comprising a first power terminal, a second power terminal, and a control terminal, wherein the first power terminal of the adjustment switch is coupled to the second terminal of the adjustment capacitor, and the second power terminal of the adjustment switch is coupled to the second switch, a current detection unit coupled to the resonant capacitor and the adjustment capacitor, and the current detection unit configured to detect a current flowing through the equivalent capacitor to generate a current signal, a voltage detection unit coupled to the first power terminal of the adjustment switch, and the voltage detection unit configured to detect a switch voltage of the adjustment switch, and a controller configured to control an enabled time of the resonant adjustment circuit according to an output voltage of the power converter so as to maintain the efficiency of transmitting the energy from the primary-side winding to the secondary-side winding under a full output voltage range, wherein the controller is configured to control the turning on and turning off of the adjustment switch according to a first control signal of controlling the first switch, a second control signal of controlling the second switch, a current signal corresponding to the current flowing through the equivalent capacitor, and the switch voltage of the adjustment switch, wherein the controller acquires a charging control signal according to the current signal and the first control signal, and acquires a discharging control signal according to the switch voltage and the second control signal; the controller is configured to generate a switch control signal according to the charging control signal and the discharging control signal to control the turning on and turning off of the adjustment switch.

2. The power converter as claimed in claim 1, wherein when the adjustment switch is turned off, a capacitance of the equivalent capacitor is equal to a capacitance of the resonant capacitor; when the adjustment switch is turned on, the capacitance of the equivalent capacitor is equal to an equivalent capacitance of the resonant capacitor and the adjustment capacitor in parallel.

3. The power converter as claimed in claim 1, wherein a current error signal between the current signal and a current reference value is compensated to generate a voltage compensation signal, and an intersection operation of the voltage compensation signal and the first control signal is performed to acquire the charging control signal; the switch voltage is compared with a voltage reference value to generate a voltage comparison signal, and an intersection operation of the voltage comparison signal and the second control signal is performed to acquire the discharging control signal.

4. The power converter as claimed in claim 3, wherein the controller comprises:

a calculation unit configured to receive the current signal and the current reference value, and calculate the current error signal according to the current signal and the current reference value, a compensation unit configured to receive the current error signal, and compensate the current error signal to generate the voltage compensation signal, a first AND operation unit configured to receive the voltage compensation signal and the first control signal, and perform an intersection operation of the voltage compensation signal and the first control signal to generate the charging control signal, a comparison unit configured to receive the switch voltage and the voltage reference value, and compare the switch voltage with the voltage reference value to generate the voltage comparison signal, a second AND operation unit configured to receive the voltage comparison signal and the second control signal, and perform an intersection operation of the voltage comparison signal and the second control signal to generate the discharging control signal, and an OR operation unit configured to receive the charging control signal and the discharging control signal, and perform a union operation of the charging control signal and the discharging control signal to generate the switch control signal.

5. A method of controlling a power converter, the power converter comprising a first switch, a second switch, a resonant capacitor, and a resonant adjustment circuit comprising an adjustment capacitor and an adjustment switch, the method comprising steps of:

detecting a current flowing through an equivalent capacitor formed by the resonant capacitor and the adjustment capacitor to generate a current signal, detecting a switch voltage of the adjustment switch, acquiring a first control signal of controlling the first switch and a second control signal of controlling the second switch, and controlling an enabled time of the resonant adjustment circuit according to the current signal, the switch voltage, the first control signal, and the second control signal when an output voltage of the power converter varies so as to maintain the efficiency of transmitting the energy from a primary-side winding to a secondary-side winding under a full output voltage range.

6. The method of controlling the power converter as claimed in claim 5, wherein the adjustment switch is turned on and turned off according to the current signal, the switch voltage, the first control signal, and the second control signal to control the enabled time of the resonant adjustment circuit.

7. The method of controlling the power converter as claimed in claim 6, wherein when the adjustment switch is turned off, a capacitance of the equivalent capacitor is equal to a capacitance of the resonant capacitor; when the adjustment switch is turned on, the capacitance of the equivalent capacitor is equal to an equivalent capacitance of the resonant capacitor and the adjustment capacitor in parallel.

8. The method of controlling the power converter as claimed in claim 6, wherein the controller acquires a charging control signal according to the current signal and the first control signal, and acquires a discharging control signal according to the switch voltage and the second control signal; the controller is configured to generate a switch control signal according to the charging control signal and the discharging control signal to control the turning on and turning off of the adjustment switch.

9. The method of controlling the power converter as claimed in claim 8, wherein a current error signal between the current signal and a current reference value is compensated to generate a voltage compensation signal, and an intersection operation of the voltage compensation signal and the first control signal is performed to acquire the charging control signal; the switch voltage is compared with a voltage reference value to generate a voltage comparison signal, and an intersection operation of the voltage comparison signal and the second control signal is performed to acquire the discharging control signal.

10. The method of controlling the power converter as claimed in claim 9, further comprising steps of:

providing a calculation unit to receive the current signal and the current reference value, and calculate the current error signal according to the current signal and the current reference value, providing a compensation unit to receive the current error signal, and compensate the current error signal to generate the voltage compensation signal, providing a first AND operation unit to receive the voltage compensation signal and the first control signal, and perform an intersection operation of the voltage compensation signal and the first control signal to generate the charging control signal, providing a comparison unit to receive the switch voltage and the voltage reference value, and compare the switch voltage with the voltage reference value to generate the voltage comparison signal, providing a second AND operation unit to receive the voltage comparison signal and the second control signal, and perform an intersection operation of the voltage comparison signal and the second control signal to generate the discharging control signal, and providing an OR operation unit to receive the charging control signal and the discharging control signal, and perform a union operation of the charging control signal and the discharging control signal to generate the switch control signal.

11. A power control method comprising steps of:

detecting, by a current detection unit, a current flowing through an equivalent capacitor formed by a resonant capacitor and an adjustment capacitor to generate a current signal, wherein the current detection unit is coupled to the resonant capacitor and the adjustment capacitor, detecting, by a voltage detection unit, a switch voltage of an adjustment switch, wherein the voltage detection unit is coupled to the adjustment switch, acquiring a first control signal of controlling a first switch and a second control signal of controlling a second switch, and controlling the turning on and turning off of the adjustment switch according to the first control signal, the second control signal, the current signal, and the switch voltage, and controlling an enabled time according to the current signal, the switch voltage, and the control signal when an output voltage varies so as to maintain the efficiency of transmitting the energy under a full output voltage range.

* * * * *